United States Patent
Rice

(10) Patent No.: US 11,824,339 B2
(45) Date of Patent: Nov. 21, 2023

(54) NEW WORK TO OLD WORK ELECTRICAL BOX CLIP

(71) Applicant: Michael Arthur Rice, Oldsmar, FL (US)

(72) Inventor: Michael Arthur Rice, Oldsmar, FL (US)

( * ) Notice: Subject to any disclaimer, the term of this patent is extended or adjusted under 35 U.S.C. 154(b) by 103 days.

(21) Appl. No.: 17/460,220

(22) Filed: Aug. 28, 2021

(65) Prior Publication Data

US 2023/0071593 A1    Mar. 9, 2023

(51) Int. Cl.
*H02G 3/12* (2006.01)
*F16B 2/20* (2006.01)

(52) U.S. Cl.
CPC ............. *H02G 3/121* (2013.01); *F16B 2/20* (2013.01); *Y10S 248/906* (2013.01)

(58) Field of Classification Search
CPC .......... H02G 3/121; H02G 3/123; F16B 2/20; Y10S 248/906
See application file for complete search history.

(56) References Cited

U.S. PATENT DOCUMENTS

| | | | |
|---|---|---|---|
| 2,334,799 A | 11/1943 | Thompson | |
| 4,120,416 A | 10/1978 | Suk | |
| 4,183,486 A | 1/1980 | Esoldi | |
| 4,463,438 A | 7/1984 | Zatezalo et al. | |
| 4,483,453 A * | 11/1984 | Smolik | H02G 3/125 220/3.9 |
| 5,239,132 A | 8/1993 | Bartow | |
| 7,677,503 B2 | 3/2010 | Michaud et al. | |
| 7,842,884 B2 | 11/2010 | Johnson | |
| 8,445,779 B1 | 5/2013 | Gretz | |
| 9,673,597 B2 | 6/2017 | Lee | |
| 2013/0036703 A1* | 2/2013 | Gagne | H02G 3/36 248/231.91 |

* cited by examiner

*Primary Examiner* — Michael C Zarroli

(57) ABSTRACT

(1) Clips for installation of electrical boxes into a finished framed wall. Plus the box clips can be used on various types of handy boxes for installation on existing walls, the old work box clips fasten the electrical box into a rectangular cutout in drywall.

(2) The box clips are made from a 7 and ¾ inch by 2.5 mm or about 3/32's of an inch of cylindrical metal formed in a manner to support a plastic or metal electrical box in drywall.

(3) To be used for adding electrical devices or circuits in offices or homes.

3 Claims, 8 Drawing Sheets

NEW WORK TO OLD WORK ELECTRICAL BOX CLIP

TECHNICAL FIELD

The present invention relates to electrical cut-in boxes specifically for old work cut-in boxes for installing circuits, new switches and plugs in dwelling units or commercial buildings.

BACKGROUND

Old cut-in boxes are more expensive to make and are limited to their specific design, if there is a shortage then there are no good substitutes. some of the old work cut-in boxes (metal) currently in use come with external clips that have to be purchased separately to be installed and one does not work with out the other. The plastic cut-in boxes have to be purchased as a single unit and the cost is greater than basic nail on boxes.

SUMMARY OF THE EMBODIMENTS

The New work to Old work electrical box clip can be made of rigid or malleable materials of multicolor or multi shaped cross sections and is used to hold a modified nail on electrical box, (or can be manufactured into a box), in drywall for the installation of new circuits, electrical switches, receptacles or to be used as a junction box. The New work to Old work clips can be used on round, rectangular and square types of electrical boxes: rectangular single gang, two gang, three gang or four gang just by adding extra Box Clips. The New work to Old work electrical box clip can be made as a stand alone Old work electrical box and the dimensions of the box clips can be installed in any size dry wall, example; ⅜'s inch drywall, ½ inch drywall and ⅝'s drywall. The box clips are made from a 7 and ¾ inch by 2.55 mm or about 3/32's of an inch of cylindrical metal formed in a manner to support a plastic or metal electrical box in drywall or any material mounted to framing for a finished wall.

DETAIL DESCRIPTION OF DRAWINGS

Figure 1:
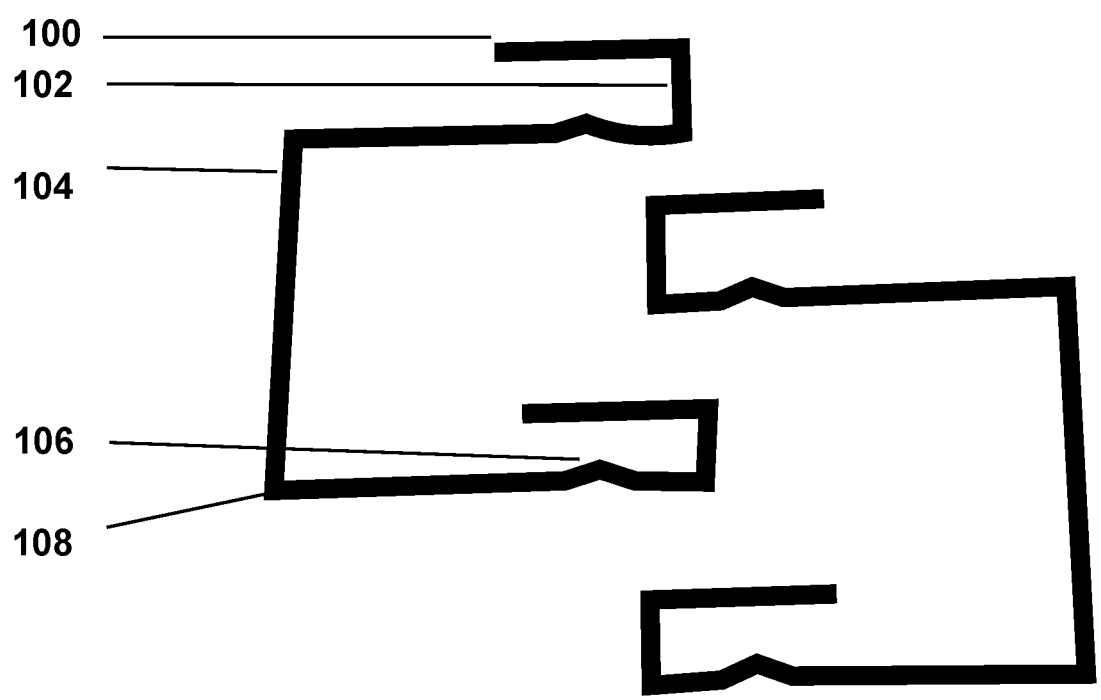
FIG. 1 is a drawing of the New work to Old work electrical box clips laying flat on a surface. They are to be installed in the modified nail on box to hold the electrical box securely in a cut out in drywall.

FIG. 1 dimension can be manufactured to fit any thickness of drywall ⅜", ½" or ⅝" etc.

For clear understanding I will describe box clips designed for ⅝s inch drywall, these measurements will be able to be transferred to work with any size drywall, by adjusting the distance from the first 90 degree turn to the second 90 degree turn. The 9/16s of an inch will vary depending on the depth of the drywall or wall material.

FIG. 1 measurement for #100 are from tip to first 90 degree turn to second 90 degree turn are 9/16 of an inch, for snug fit that holds in drywall. FIG. 1 measurement for #104 are from second 90 degree turn to third 90 degree turn are 1¾ inch from outside to outside. FIG. 1 measurements for #106 are a saddle bend (or a flattened hammered are about a ¼ inch up from the second 90 degree turn to mirrored on the opposite hook. FIG. 1 measurements for #108 are the thickness of the malleable round wire, made of metal at 3/32s of an inch.

Figure 2:
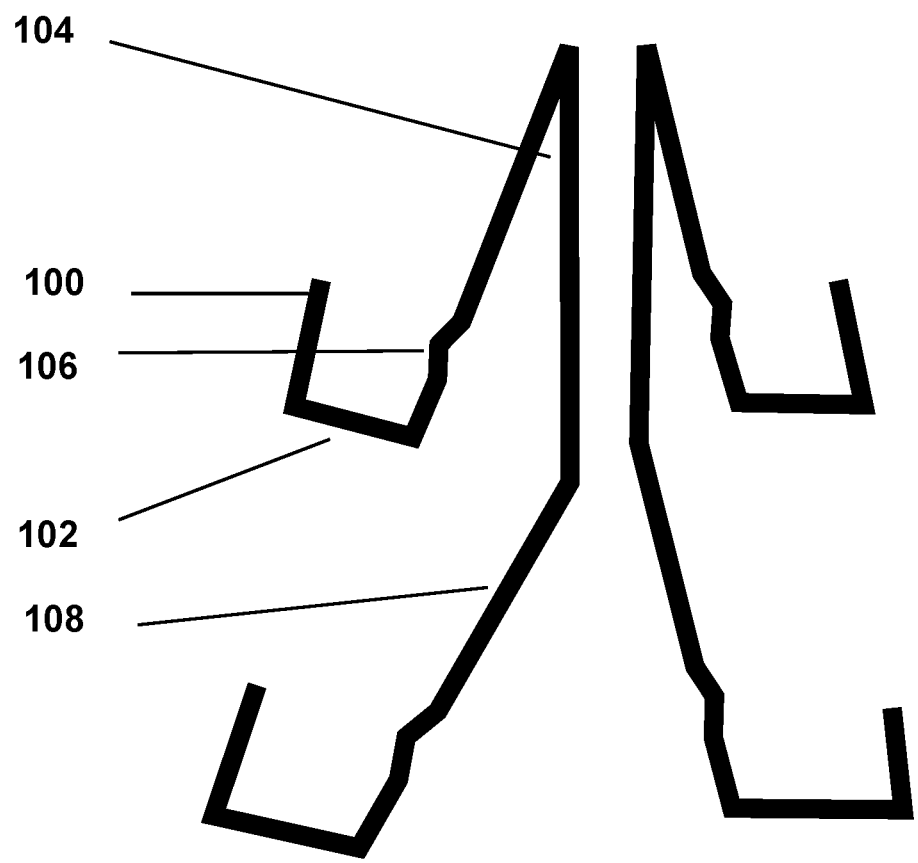
FIG. 2 is a drawing of the New work to Old work electrical box clips in an upright position side view.

FIG. 2 is a side view of the box clips with the same exact measurements of FIG. 1.

Figure 3:
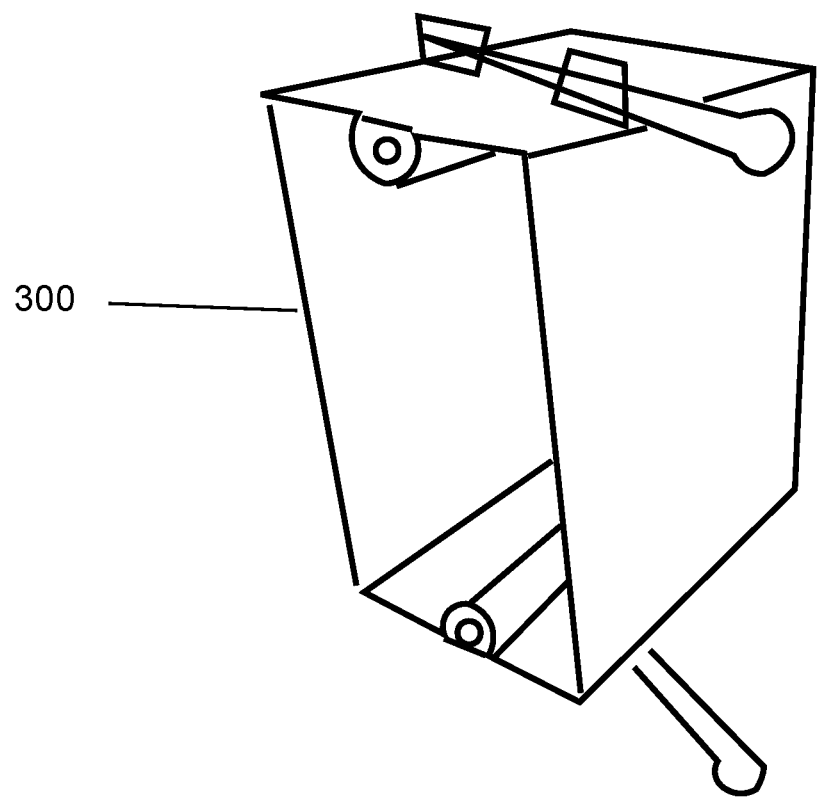
FIG. 3 is a drawing of a New work box that would be used on new construction (no drywall installed) where the electrician would wire a dwelling unit or commercial building.

FIG. 3 is a simple illustration of an electrical nail on box (no drywall installed) to be modified into an Old work electrical cut in box (drywall installed).

Figure 4:
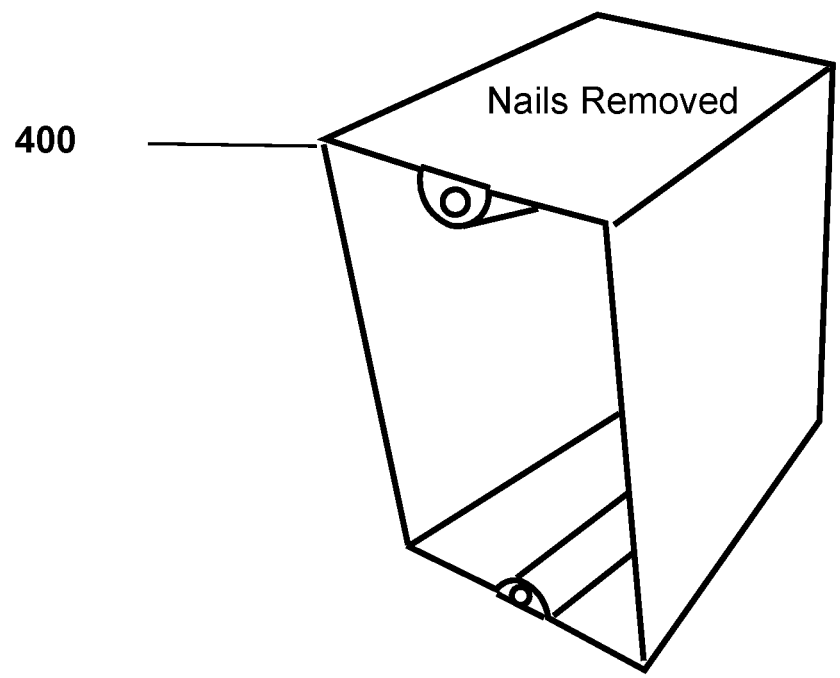
FIG. 4 is a drawing of a Modified New work electrical box, with nails removed, to be used as an old work electrical box, (drywall installed).

FIG. 4 is an illustration of a New work box with the nail holder and nails removed to be used as an Old work cut in electrical box.

Figure 5:
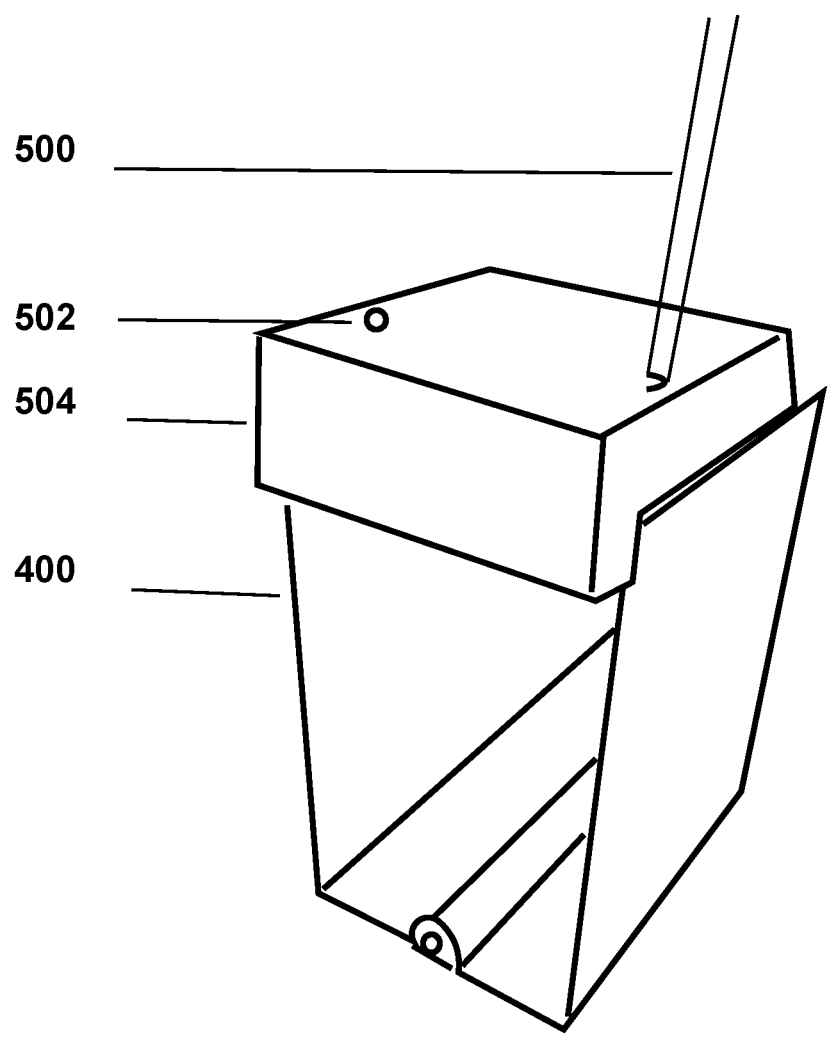
FIG. 5 is a drawing of the Modified New work electrical box (nail holders removed, for a smooth surface) then a template for drilling holes to install the New work to Old work electrical box clips.

FIG. 5 is an illustration of the drill template on the modified New work electrical box. FIG. 5 measurements of drill bit #500 are 7/64 of an inch. FIG. 5 measurements for #502 are 7/64 of an inch hole drilled in the template measured from front edge back to hole at ¾ of an inch to center, the 7/64 inch hole to the next 7/64 inch hole are measured 1¾ inch apart. FIG. 5 measurements for #504 are ¾ of an inch height by 2⅛ inch wide. FIG. 5 measurements for #504 on the inside edge is ⅜ of an inch high to create the 90 degree edge. FIG. 5 #400 is described as a nail on box with nails and nail holders removed for a smooth surface.

Figure 6:
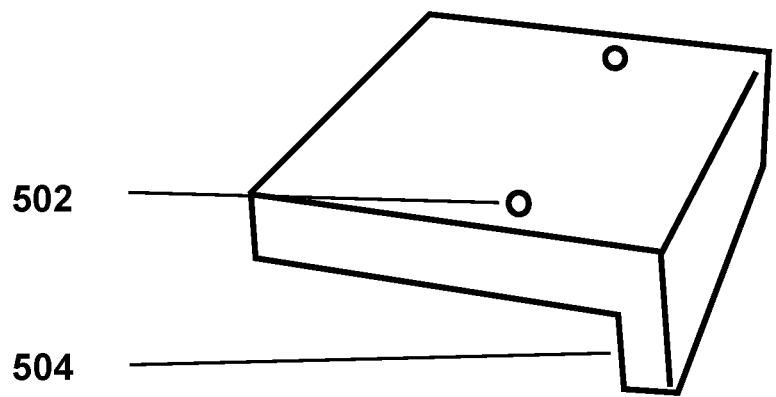

FIG. 6 is an illustration of the template to drill the 7/64s inch holes quickly and efficiently in the modified New work box to make it into an Old work box.

Figure 7:
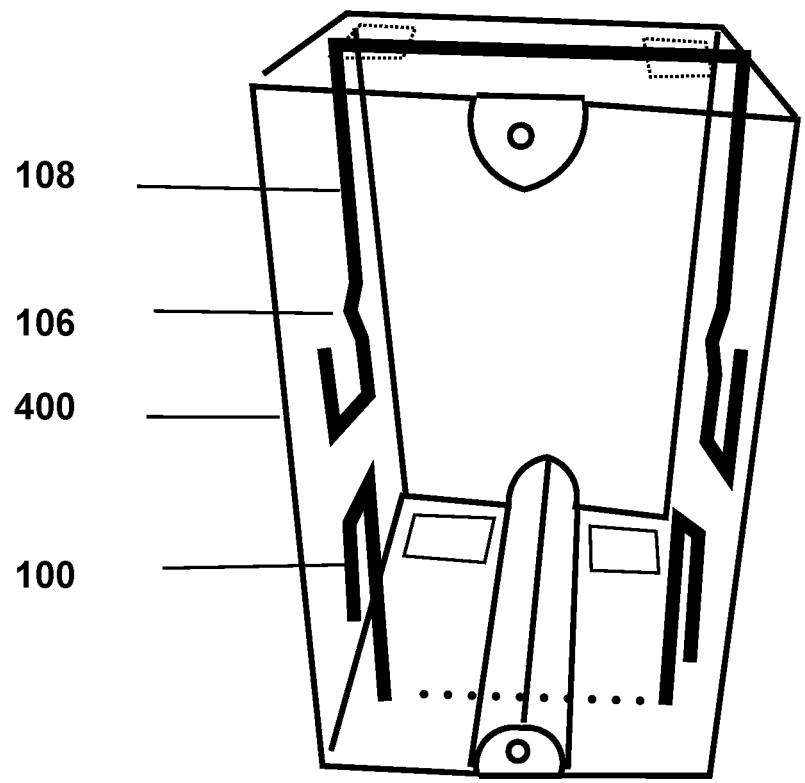
FIG. 7 is a drawing of the New work to Old work electrical box clips installed in the modified electrical box.

FIG. 7 shows the clips installed into FIG. 4s number #400, ready to be inserted into the cut out in drywall for electrical use. Number #108 is the electrical box clip, #106 is the saddle (or flattened ¼ inch) to lock clip securely in place, #100 will keep the box securely fastened on the from of the box.

Figure 8:
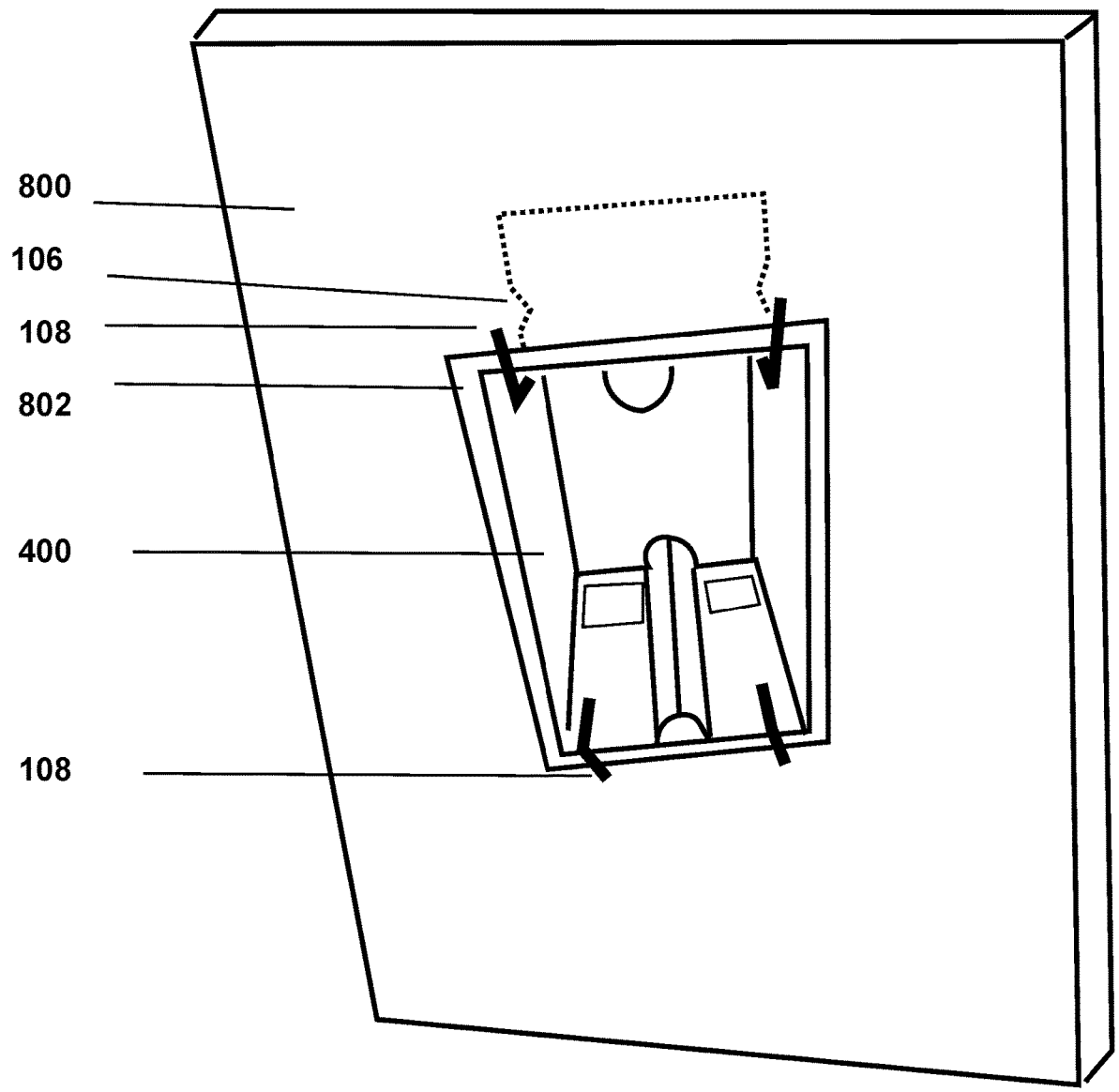
FIG. 8 is a drawing of the modified electrical box with the New work to Old work electrical box clips holding the electrical box securely in place in a cut in of drywall, for the installation of electrical switches, receptacles or used as a junction box.

FIG. 8 is an illustration of the New work to Old work electrical box installed in drywall. FIG. 8 number #800 is ⅝ inch drywall. FIG. 8 number #106 is the part of the clip that holds the box to the inside part of the drywall. FIG. 8 number #108 is the part of the clip that holds the box to the outside part of the drywall. FIG. 8 number #802 is the hole cut in the drywall for the electrical box. FIG. 8 number #400 is the electrical box being held in the drywall by the Old work electrical box clips.

Use: To use the Old work electrical box clips, the box is held in the opening and the Box Clips are pushed up and second one is pushed down past the saddle locks (or flattened ¼ inch lock) to securely hold the cut in electrical box in place.

Electrical box, new work type converted to old work type for installation of electrical wire to install new circuits or switches and receptacles in commercial and residential buildings.

| FIG. 1 | Drawings |
|---|---|
| 100 | ¾ of an inch front hook |
| 102 | 9/16 of an inch for ⅝ drywall clip |
| 104 | 1 ¾ of a inch for hole spacing |
| 106 | Saddle lock or Flattened type grip lock |
| 108 | 3/32 round Old work box Clip |
| FIG. 2 | Side View of FIG. 1 |
| FIG. 3 | Drawings |
| 300 | Nail on box |
| FIG. 4 | Drawings |
| 400 | Nail on box with nails removed |
| FIG. 5 | Drawings |
| 500 | 7/64 inch drill bit |
| 502 | 7/64 inch hole |
| 504 | ¾ inch height, 2 ⅛ inch wide with ⅜ inch lip |
| 400 | Nail on box with nails removed |
| FIG. 8 | Drawings |
| 502 | 7/64 inch hole |
| 504 | ¾ inch height, 2 ⅛ inch wide with ⅜ inch lip |
| FIG. 7 | Drawings |
| 108 | 3/32 round Old work box clip |
| 106 | Saddle lock or Flattened type grip lock |
| 400 | Nail on box with nails removed |
| 100 | ¾ of and inch front hook |
| FIG. 8 | Drawings |
| 800 | ⅝ inch Drywall |
| 106 | Saddle lock or flattened type grip lock |
| 108 | 3/32 round Old work box clip |
| 802 | hole cut in drywall for electrical box |
| 400 | Nail on box with nails removed |
| 108 | 3/32 round Old work box clip |

The invention claimed is:

1. A Device comprising:
  a. cylindrical metallic rigid wire measuring a length of 7¾'s inches, with a diameter measuring 3/32's of an inch, bent into a shape of one large U with sharp 90 degree angles measuring 1¾'s of an inch across, with two small u's measuring 9/16's of an inch across, with said sharp 90 degree angles at the opened end of the said one large U, face forward on said large U, above said small u's measuring 9/16's of an inch across is a saddle bend or flattened grip bend to hold the device in an electrical box where holes are drilled;
  b. said cylindrical metallic rigid wire measuring a length of 7¾'s inches, with a diameter measuring 3/32's of an inch, is bent to form a device to hold the electrical box within a cut-in hole in drywall;
  c. wherein said cylindrical metallic rigid wire measuring a length of 7¾'s inch length, can vary to accommodate depth of drywall.

2. Device of said claim 1 is accompanied by a second device to place holes in said old work electrical box, measuring ¾'s of an inch high, 2⅛'s inch wide with ⅜'s inch lip, with 7/64's inch holes at 1¾'s an inch apart.

3. Rigid wire bent into the shape of a squared U with sharp 90 degree bends at the base, connected to two smaller u shapes with said sharp 90 degree bends squared at each distal end of the U shaped rigid wire, this bent rigid wire to hold a single gang, double gang or larger electrical box into drywall for the installation of new electrical devices or circuits.

\* \* \* \* \*